United States Patent
Bulumulla et al.

(10) Patent No.: US 10,168,417 B2
(45) Date of Patent: Jan. 1, 2019

(54) SYSTEMS AND METHODS FOR TRACKING LOCATION IN INDUSTRIAL FACILITIES

(71) Applicant: General Electric Company, Schenectady, NY (US)

(72) Inventors: Selaka Bandara Bulumulla, Niskayuna, NY (US); Michael James Hartman, Niskayuna, NY (US); S. M. Shajedul Hasan, Rexford, NY (US); Steven William Wik, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 6 days.

(21) Appl. No.: 15/233,641

(22) Filed: Aug. 10, 2016

(65) Prior Publication Data
US 2018/0045808 A1    Feb. 15, 2018

(51) Int. Cl.
*H04R 1/02* (2006.01)
*G01S 5/16* (2006.01)
(Continued)

(52) U.S. Cl.
CPC ...... *G01S 5/16* (2013.01); *G01S 1/70* (2013.01); *G06K 19/0723* (2013.01);
(Continued)

(58) Field of Classification Search
CPC .. G06F 19/3418; G06F 19/323; G06F 19/327; G06F 9/322; G06F 19/322;
(Continued)

(56) References Cited

U.S. PATENT DOCUMENTS 7,592,911 B1    9/2009  Hudgens et al.
7,843,348 B2   11/2010  Hayford et al.
(Continued)

FOREIGN PATENT DOCUMENTS

CN    1953408    4/2007
CN    201690442  12/2010
(Continued)

OTHER PUBLICATIONS

S.S.; Intelligent Computing Applications (ICICA), 2014 International Conference; Smart Helmet Using RF and WSN Technology for Underground Mines Safety; ; Mar. 6-7, 2014, pp. 305-309.
(Continued)

*Primary Examiner* — Dionne H Pendleton
(74) *Attorney, Agent, or Firm* — GE Global Patent Operation; Nitin Joshi

(57) ABSTRACT

A system includes a control system. The control system includes a processor configured to receive a first signal from a light source within an industrial facility. The first signal includes a unique identification code configured to indicate at least a partial identity of a human resource within the industrial facility. The processor is configured to determine a proximity of the human resource with respect to the light source based at least in part on a received signal strength indicator (RSSI) of the first signal, and to generate an indication of a location of the human resource within the industrial facility based on the determined proximity of the human resource to the light source.

18 Claims, 2 Drawing Sheets

(51) Int. Cl.
*H04B 17/318* (2015.01)
*H04L 12/24* (2006.01)
*H04L 12/933* (2013.01)
*H05B 37/02* (2006.01)
*H04W 4/80* (2018.01)
*G06K 19/07* (2006.01)
*H04B 10/114* (2013.01)
*H04B 10/116* (2013.01)
*G01S 1/70* (2006.01)
*H04B 17/27* (2015.01)

(52) U.S. Cl.
CPC ....... *H04B 10/116* (2013.01); *H04B 10/1149* (2013.01); *H04B 17/27* (2015.01); *H04B 17/318* (2015.01); *H04L 41/22* (2013.01); *H04L 49/1584* (2013.01); *H04W 4/80* (2018.02); *H05B 37/0272* (2013.01)

(58) Field of Classification Search
CPC .... G05D 1/0088; G05D 1/0022; G05D 1/021; G06K 7/10366; G06K 19/0712; G06K 19/0723; G06Q 10/06398; G06Q 10/0833; G06Q 10/087; G06Q 20/325; G06Q 30/0267; G06Q 10/083; G06Q 10/0832; G06Q 10/0835; G06Q 10/08355; G06Q 10/0836; G06Q 10/0838; G06Q 20/14; G06Q 20/22; G06Q 20/40; G06Q 30/02; G08B 21/245; H04W 64/003; H04W 4/80; H04W 12/06; H04W 12/08; H04W 24/10; H04W 4/00; G01S 5/16; G01S 1/70; H04B 17/27; H04B 17/318; H04B 10/116; H04B 10/1149; H04L 41/22; H04L 49/1584; H04L 41/026; H04L 41/0813; H04L 41/0823; H04L 43/10; H04L 45/22; H04L 65/403; H04L 67/10; H04L 67/12; H04L 67/18; H04L 67/303; H04L 67/42; H05B 37/0272; B65D 25/02; G01C 21/00; G01C 21/3407; G01C 21/3453
See application file for complete search history.

(56) References Cited

U.S. PATENT DOCUMENTS

| | | |
|---|---|---|
| 8,294,568 B2 | 10/2012 | Barrett |
| 8,587,414 B2 | 11/2013 | Bandyopadhyay et al. |
| 8,880,584 B2 | 11/2014 | Xu et al. |
| 2002/0089722 A1* | 7/2002 | Perkins ................. G01S 1/70 398/140 |
| 2011/0309931 A1 | 12/2011 | Rose |
| 2017/0164319 A1* | 6/2017 | Skaaksrud ............ H04W 12/06 |
| 2017/0256155 A1* | 9/2017 | Sengstaken, Jr. .... G08B 21/245 |
| 2017/0366368 A1* | 12/2017 | Crayford ............ H04L 12/2803 |
| 2018/0153023 A1* | 5/2018 | Meerbeek .......... H05B 37/0227 |

FOREIGN PATENT DOCUMENTS

| | | |
|---|---|---|
| CN | 202431305 | 9/2012 |
| CN | 202504280 | 10/2012 |

OTHER PUBLICATIONS

Qinghua et al.; Industrial Electronics and Applications, 2009 ICIEA 2009, 4th IEEE Conference; Object Position Tracking Based on E-Map and RFID in Coal Mine; May 25-27, 2009, pp. 880-885.
U.S. Appl. No. 14/977,036, filed Dec. 21, 2015, Selaka Bandara Bulumulla.

\* cited by examiner

SYSTEMS AND METHODS FOR TRACKING LOCATION IN INDUSTRIAL FACILITIES

BACKGROUND OF THE INVENTION

The subject matter disclosed herein relates generally to industrial safety and warning systems, and more particularly, to systems and methods for safety and location tracking and identification in industrial environments.

Industrial facilities, such as mining and other similar industrial environments, may include various interrelated equipment and processes, and may thus include one or more potentially hazardous areas. For example, mining industrial environments may potentially include areas of high temperatures and pressures, gaseous areas, large and heavy machinery, moving machinery, and so forth. Furthermore, mining personnel (e.g., miners, engineers, field technicians, supervisors, contractors, etc.) may be employed to work in such mining industrial environments to excavate valuable natural resources (e.g., coal, oil shale, precious metals, and so forth). It may be useful to provide one or more safety and tracking systems to protect and locate personnel employed to work in mining and/or other industrial environments.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a control system. The control system includes a processor configured to receive a first signal from a light source within an industrial facility. The first signal includes a unique identification code configured to indicate at least a partial identity of a human resource within the industrial facility. The processor is configured to determine a proximity of the human resource with respect to the light source based at least in part on a received signal strength indicator (RSSI) of the first signal, and to generate an indication of a location of the human resource within the industrial facility based on the determined proximity of the human resource to the light source.

In a second embodiment, a non-transitory computer-readable medium includes code with instructions to cause a processor to receive a first signal from a light source within an industrial facility. The first signal includes a unique identification code configured to indicate at least a partial identity of a human resource within the industrial facility. The code includes instructions to cause the processor to determine a proximity of the human resource with respect to the light source based at least in part on a received signal strength indicator (RSSI) of the first signal, and to cause the processor to generate an indication of a location of the human resource within the industrial facility based on the determined proximity of the human resource to the light source.

In a third embodiment, a system includes a plurality of light sources configured to illuminate an industrial facility. Each of the plurality of light sources includes a transceiver configured to receive a first signal from an electronic hardhat configured to be worn by a human resource within the industrial facility. The first signal includes a unique identification code of the electronic hardhat and a received signal strength indicator (RSSI). The transceiver is also configured to generate and transmit a second signal to a control system of the industrial facility based at least in part on the unique identification code and the RSSI of the first signal. The second signal comprises an indication of a precise or approximate location of the electronic hardhat within the industrial facility.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
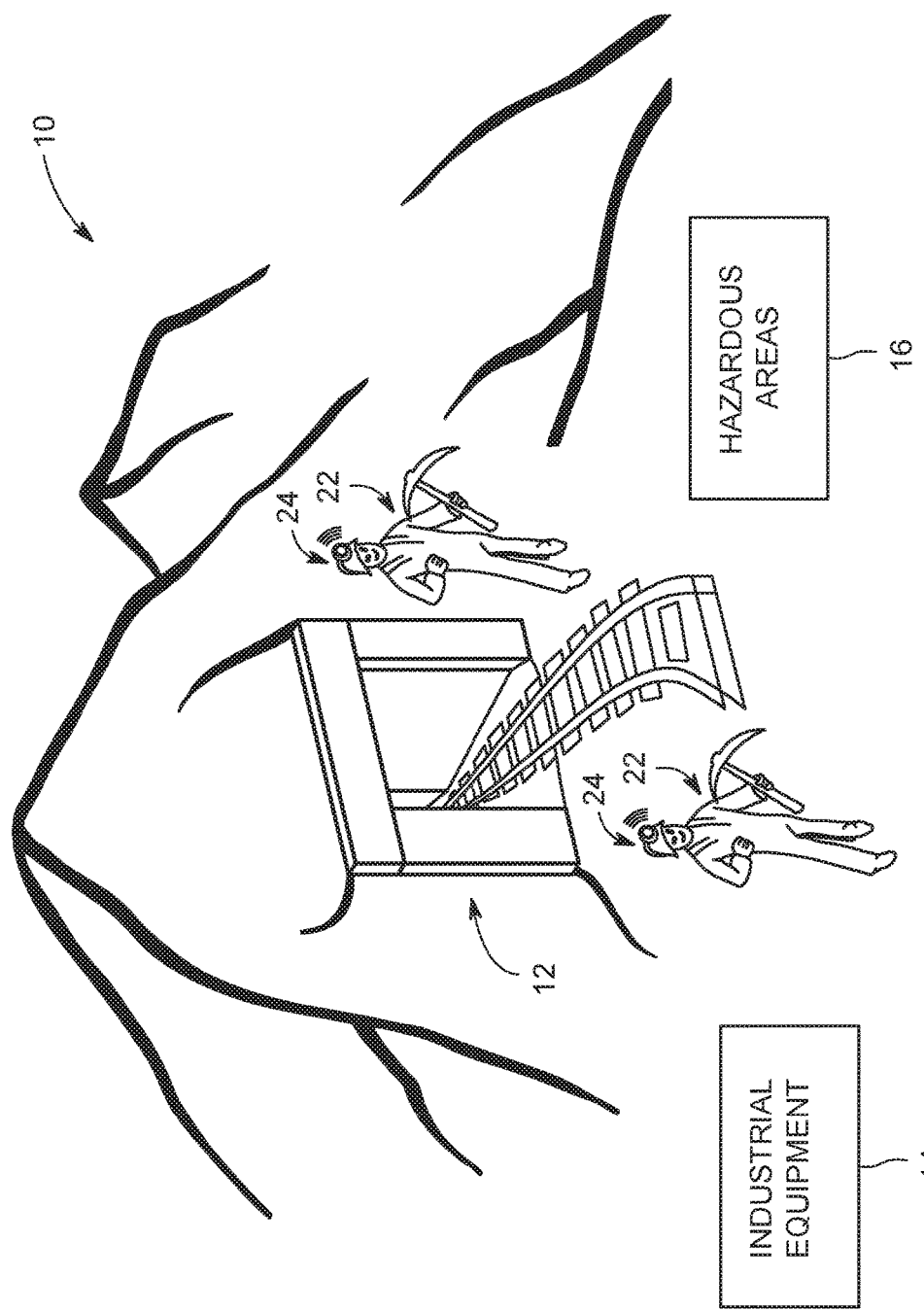
FIG. 1 is an example diagram of a mining industrial environment, in accordance with present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to a location tracking and identification system that may be used to locate, track, and identify certain personnel (e.g., miners, engineers, field technicians, supervisors, contractors, etc.) that may be employed to work in certain facilities, such as mining or other industrial environments. In certain embodiments, the location and tracking system may include a communication system of electronic hardhats worn by the personnel, a system of light sources (e.g., a light-emitting diode [LED] lighting system) deployed to illuminate the mining industrial environment and communicatively coupled to each other in a wireless mesh network, and a central control system (e.g., mining operations control system) communicatively coupled to the number of light sources.

For example, the electronic hardhats may include an integrated wireless transmitter (e.g. low cost, Bluetooth® transceiver) that transmits a unique identification code (e.g. media control access [MAC] address) to uniquely identify a specific electronic hardhat (and by extension the personnel wearing the specific electronic hardhat). The unique identification code and a received signal strength indicator (RSSI) may be detected by a wireless transceiver (e.g. Bluetooth® transceiver) integrated into each respective light source of the system of light sources. The respective wireless transceiver of the light source that initially received the unique identification code and the RSSI may transmit the unique identification code, the RSSI, a time stamp, and identification data of the specific wireless transceiver and light source that initially received the unique identification code from the electronic hardhat may transmit a signal via the wireless network of the system of light sources (e.g. connected in a Bluetooth® mesh network) to the central control system (e.g., mining operations control system). Based on the information received from the wireless transceiver and light source, the central control system may determine the precise and/or approximate location of the personnel within the mining industrial facility.

Furthermore, while the present embodiments may be generally directed toward safety and personnel location tracking and identification in mining and industrial environments, it should be appreciated that the techniques described herein may be extended to any of various applications such as, for example, other industrial environments (e.g., power generation plants, chemical production plants, petroleum refineries, manufacturing facilities, building construction sites, and so forth) medical environments (e.g., hospitals, magnetic resonance imaging [MRI] labs), construction applications (e.g., new building construction, building repairs), and other similar industrial and/or commercial applications.

With the foregoing mind, it may be useful to describe an embodiment of an industrial facility, such as an industrial mining facility 10 that may employ the present techniques, as depicted in FIG. 1. As illustrated, the industrial mining facility 10 may include a mine 12. The mine 12 may be a coal mine, a metals mine, an oil shale mine, a gemstones mine, a limestone mine, a rock salt mine, a gravel mine, a clay mine, or other natural resources that may be mined. As further depicted in FIG. 1, the industrial mining facility 10 may include industrial equipment 14 and one or more hazardous areas 16 within or external to the mine 12. For example, the industrial equipment 14 may include one or more automatic mining machines, launch vehicles (e.g., and conveyor belt of the launch vehicle), storage vessels (e.g., storage tanks), turbine systems (e.g., steam turbines, gas turbines, hydroelectric turbines, wind turbines), generators, expanders, pumps, compressors, valves, electrical systems, chemical reactors, gasifiers, gas treatment systems (e.g., acid gas removal systems) air separation units (ASUs), boilers, furnaces, water treatment systems, heat recovery steam generator (HRSG) systems, vats, conveyor belt systems, conduits, milling machines, forging equipment, casting equipment, and other equipment that may be useful in operating the industrial mining facility 10.

In certain embodiments, as previously noted, the industrial mining facility 10 may also include one or more potentially hazardous areas 16. For example, the potentially hazardous areas 16 may include one or more confined spaces, one or more areas of high temperatures and pressures, gaseous areas, restricted areas of the industrial mining facility 10, or any other area of the industrial mining facility 10 the may be potentially hazardous to the human resources 22 within the industrial mining facility 10. For example, as will be further appreciated, while supporting operations in one or more of the potentially hazardous or restricted areas of the industrial mining facility 10, mining facility human resources 22 (e.g., miners, engineers, field technicians, supervisors, contractors, emergency and safety teams, etc.) may be susceptible to possible hazards including electromagnetic radiation (e.g., X-rays, gamma rays, etc.) exposure, nuclear radiation, potentially hazardous gas (e.g., CO emissions), dust, chemical, oxygen depleted spaces, fire, smoke, thermal energy and radiation, rotational energy and vibration, exposure to excessive temperatures (e.g., boiling or freezing temperatures), fatigue, alertness level, noise levels, exposure to low and high pressure environments, and so forth.

Figure 2:
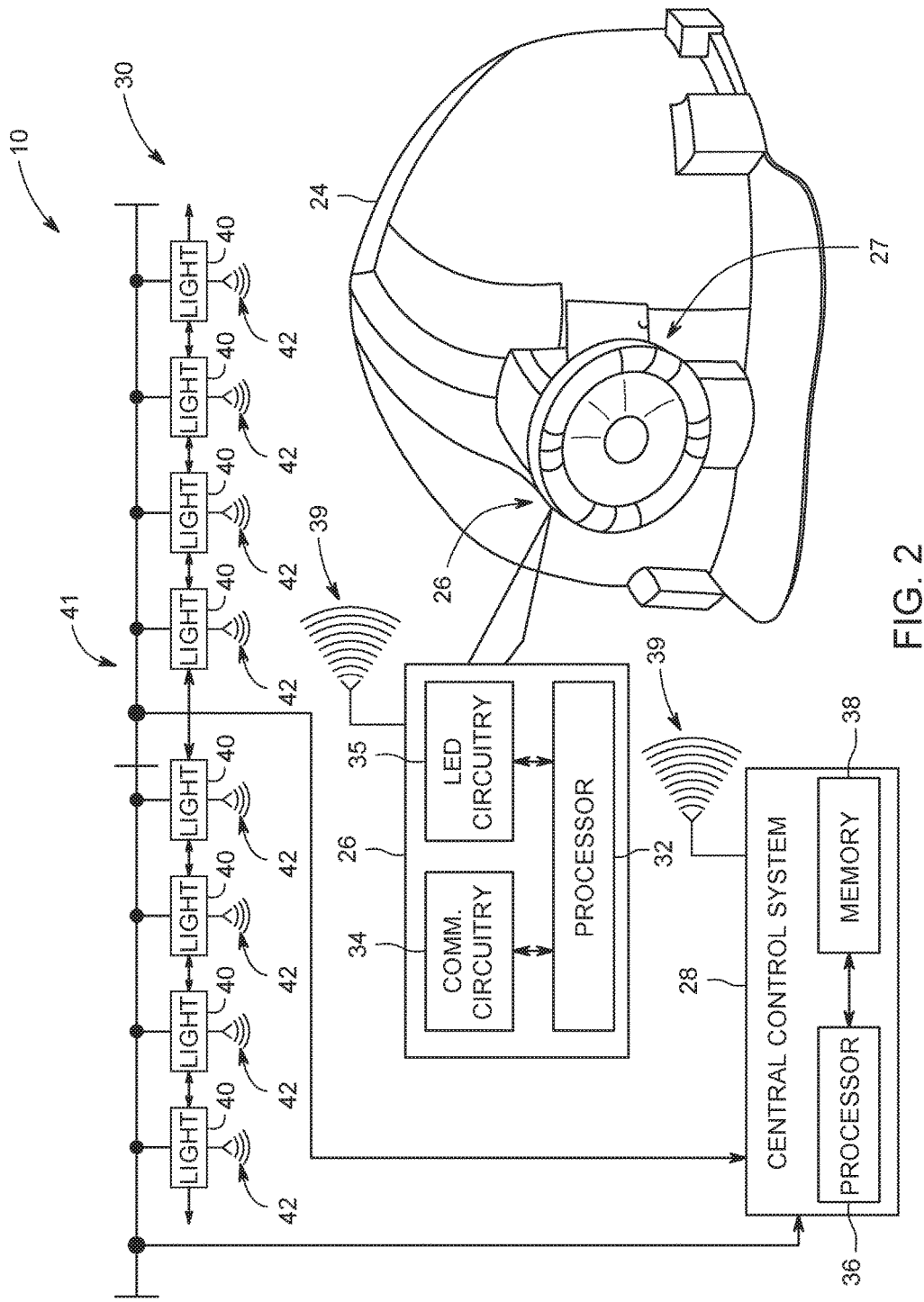
FIG. 2 is an illustration of a safety electronic hardhat, central control system, personnel location identification lighting system, in accordance with present embodiments.

Turning now to FIG. 2, a detailed embodiment of an electronic hardhat 24 (e.g., or other wearable electronic device) that may be worn by the human resources 22 (e.g., miners, engineers, field technicians, supervisors, contractors, emergency and safety teams, etc.) as the human resources 22 maneuver in and about the industrial mining facility 10 is depicted. FIG. 2 also illustrates a central control system 28 and a power and lighting system 30 that may be constructed or positioned inside and about the industrial mining facility 10 (e.g., constructed along a ceiling inside of the mine 12). For example, the electronic hardhat 24 may be worn by the human resources 22 throughout the time the human resources 22 are in and about the industrial mining facility 10 as an additional safety protocol. In certain embodiments, as further depicted in FIG. 2, the electronic hardhat 24 may include an LED headlamp assembly 26 integrated into the electronic hardhat 24. The LED headlamp assembly 26 may allow the electronic hardhat 24 to communicate with the communications circuitry 34 (e.g., attached to the industrial equipment 14 and/or around and about the potentially hazardous areas 16) and a central control system 28.

The LED headlamp assembly 26 may include a headlamp 27, a processor 32, communications circuitry 34, re-chargeable battery (e.g., Lithium-ion battery), an antenna and LED driving and lighting circuitry 34. The processor 32 may be operatively coupled to a memory device to execute instructions for carrying out the presently disclosed techniques. These instructions may be encoded in programs or code stored in a tangible non-transitory computer-readable medium, such as a memory device of the LED headlamp assembly 26 and/or other storage. The processor 32 may be a general-purpose processor, system-on-chip (SoC) device, an application-specific integrated circuit (ASIC), or some other similar processor configuration.

In certain embodiments, as previously noted, the electronic hardhat 24 may also include the communications circuitry 34 and LED driving and lighting circuitry 35. The communications circuitry 34 (e.g., including an antenna 39) may include any of various network interfaces such as, for example, interfaces for a personal area network (PAN), such as a Bluetooth® network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, or long term evolution (LTE) cellular network. The communications circuitry 34 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), and so forth.

In certain embodiments, the communications circuitry 34 may include, for example, a Bluetooth® low energy (BLE) beacon, a radio frequency identification (RFID) tag, a subscriber identification module (SIM) card, or any of various active devices that may allow the electronic hardhat 24 (e.g., protective helmet) worn by the human resources 22 (e.g., miners, engineers, field technicians, supervisors, contractors, emergency and safety teams, etc.) to communicate with the central control system 28 and the lighting system 30. In some embodiments, the communications circuitry 34 may transmit one or more advertising data packets (e.g., Bluetooth® low energy [BLE] advertising packets) with a unique transmitter identifier code (e.g., MAC address) to, for example, other electronic hardhats 24 worn by other human resources 22 (e.g., miners, engineers, field technicians, supervisors, contractors, etc.), to and between each light source 40 of the lighting system 30, and/or the central control system 28 as an indication of a physical position and location of the human resources 22 within or about the industrial mining facility 10 (e.g., within or about the industrial equipment 14 and/or hazardous areas 16 or inside of the mine 12).

In certain embodiments, the LED driving and lighting circuitry 35 may include any device or any number of devices (e.g., LED driver circuitry) that may be useful in providing a source of power to, for example, a number of LED lighting devices (e.g., an LED lamp, an LED lighting system) and/or non-LED lighting device or system (e.g., a fluorescent lamp, a linear fluorescent lamp (LFL) system, a compact fluorescent (CFL) system, a halogen lamp, a high intensity discharge (HID) lamp, and so forth.

In certain embodiments, as previously noted, the electronic hardhat 24 may communicate with the central control system 28. The central control system 28 may also include processing circuitry, such as a processor 36 (e.g., general purpose processor or other processor) and a memory 38, that may be used, for example, to control (e.g., trip or temporarily shutdown) the industrial equipment 14 based on a received signal from the electronic hardhat 24. As further depicted, the central control system 28 may also include an antenna 39 useful for wireless communication with the electronic hardhat 24 and/or the communications circuitry 34 (e.g., attached to the industrial equipment 14 and/or around or about the potentially hazardous areas 16).

In certain embodiments, as previously noted, the electronic hardhat 24 may also communicate with the power and lighting system 30. For example, the power and lighting system 30 may be included, for example, inside and about the industrial mining facility 10 to illuminate the mining facility as the human resources 22 (e.g., miners, engineers, field technicians, supervisors, contractors, emergency and safety teams, etc.) maneuver in and about the industrial mining facility 10 (e.g., within or about the industrial equipment 14 and/or hazardous areas 16 or inside of the mine 12). As depicted, the power and lighting system 30 may include a number of light sources 40, which may be coupled via a power bus (e.g., alternating current [AC] power bus) and conductors (e.g., electrical wiring) 41. The light sources 40 may include, for example, a number of light-emitting diodes (LEDs) and lighting devices (e.g., LED lamps). For example, in some embodiments, in addition to the power bus and conductors 41 (e.g., electrical wiring) powering the light sources 40, the power bus and conductors 41 (e.g., electrical wiring) may be used as a medium for two-way communication (e.g., power-line communication [PLC]) between, for example, the individual light sources 40 of the power and lighting system 30 and the central control system 28.

In certain embodiments, as further depicted by FIG. 2, the light sources 40 may each include transceivers 42 (e.g. Bluetooth transceivers or other low-power transceivers) that may be integrated into the respective light sources 40 and may be powered via the power and lighting system 30. In certain embodiments, the respective transceivers 42 of the light sources 40 may be used to allow each of the light sources 40 to wirelessly communicate data to each of the other light sources 40. For example, in certain embodiments, the light sources 40 may receive data transmission packets (BLE or other low energy data transmission packets) from the electronic hardhat 24 worn by the human resources 22 (e.g., miners, engineers, field technicians, supervisors, contractors, etc.). Specifically, the electronic hardhat 24 may, for example, wirelessly transmit the data packets to the nearest light source 40, which may then transmit (e.g., via the transceiver 42) those data packets to the next nearest light source 40 and so on (e.g., in a mesh networking configuration) until those data packets are wirelessly routed to the processor 36 of the central control system 28.

In certain embodiments, the electronic hardhat 24 may transmit data packets with a hazard beacon identification code (e.g., media access control [MAC] address) to the light sources 40, indicating the identity and the location of the human resources 22 within or about the industrial mining facility 10 (e.g., within or about the industrial equipment 14 and/or hazardous areas 16 or inside of the mine 12). For example, in certain embodiments, when one of the light sources 40 receives data packets with a hazard beacon identification code (e.g., media access control [MAC] address) via the transceiver 42 and determines a received signal strength indication (RSSI) of the signal carrying the data packets, the light source 40 that received the data packets may transmit a signal including a unique identification code (e.g., MAC address corresponding to the unique electronic hardhat 24 worn by the respective personnel 22), a timestamp, the RSSI value, and identification data (e.g., quick response (QR) code, serial number, radio frequency identification [RFID] parameter, and so forth) of the light source 40 that received the data packets.

The light source 40 that initially received the data packets may then transmit (e.g., via the transceiver 42) the received data packets to the next light source 40 in, for example, a mesh networking scheme (e.g. Bluetooth® mesh networking connection scheme), such that the data packets and associated information (e.g., unique identification code of the particular electronic hardhat 24, identification data [e.g., quick response (QR) code, serial number, radio RFID parameter, and so forth] of the light source 40, RSSI values, timestamp, and/or additional metadata) are transmitted (e.g., wirelessly) from light source 40 to light source 40 until arriving at the central control system 28.

In this way, the precise or approximate location of the human resources 22 (e.g., miners, engineers, field technicians, supervisors, contractors, etc.) may be identified and tracked, as the central control system 28 may identify the location of the human resources 22 in relation to the light source 40 that first received the data packets from the electronic hardhat 24. That is, in some embodiments, the precise location of each of the light sources 40 may be parameters known to the central control system 28, and thus once the central control system 28 receives the data packets and the additional tracking and routing information (e.g., RSSI values, unique identification code of the light sources 40), the precise and/or approximate location of the human resources 22 may be identified (e.g., based on the estimated distance between the electronic hardhat 24 and one or more of the light sources 40).

In certain embodiments, based on the data packets and associated information (e.g., unique identification code of the particular electronic hardhat 24, identification data [e.g., quick response (QR) code, serial number, radio frequency identification (RFID) parameter, and so forth] of the light source 40, RSSI values, timestamp, and/or additional metadata), the central control system 28 may generate a map or other graphical representation (e.g., charts, graphs, thermal radiation maps, and so forth) of the human resources 22 (e.g., miners, engineers, field technicians, supervisors, contractors, emergency and safety teams, etc.) to track and identify the location the human resources 22 (e.g., miners, engineers, field technicians, supervisors, contractors, emergency and safety teams, etc.) in the proximity of the industrial equipment 14 and/or the hazard areas 16, or within one or more mines of the industrial mining facility 10.

In certain embodiments, the map or other graphical representation generated by the central control system 28 may be presented, for example, on a display to an operator to view the precise or approximate location of the human resources 22 (e.g., based on the data packets and additional tracking and routing information received at the central control system 28 from the electronic hardhat via the light sources 40) in the proximity of the industrial equipment 14 and/or the hazard areas 16, or within the mine 12. In one embodiment, the operator may also manually shutdown or trip the industrial equipment 14 based on the tracking data provided to the central control system 28.

Technical effects of the present embodiments relate to a location and tracking system that may be used to locate and track personnel (e.g., miners, engineers, field technicians, supervisors, contractors, etc.) that may be employed to work in certain mining or other industrial environments. In certain embodiments, the location and tracking system may include a communication system of electronic hardhats worn by the personnel, a system of light sources (e.g., a light-emitting diode [LED] lighting system) deployed to illuminate the mining industrial environment and communicatively coupled to each other in a wireless mesh network, and a central control system (e.g., mining operations control system) communicatively coupled to the number of light sources.

For example, the electronic hardhats may include an integrated wireless transmitter (e.g. low cost, Bluetooth® transceiver) that transmits a unique identification code (e.g. media control access [MAC] address) to uniquely identify a specific electronic hardhat (and by extension the personnel wearing the specific electronic hardhat). The unique identification code and a received signal strength indicator (RSSI) may be detected by a wireless transceiver (e.g. Bluetooth® transceiver) integrated into each respective light source of the system of light sources. The respective wireless transceiver of the light source that initially received the unique identification code and the RSSI may transmit the unique identification code, the RSSI, a time stamp, and identification data of the specific wireless transceiver and light source that initially received the unique identification code from the electronic hardhat may transmit a signal via the wireless network of the system of light sources (e.g. connected in a Bluetooth® mesh network) to the central control system (e.g., mining operations control system). Based on the information received from the wireless transceiver and light source, the central control system may determine the precise and/or approximate location of the personnel within the mining or industrial facility.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. A system, comprising:
a control system, comprising:
a processor configured to:
receive a first signal from a light source within an industrial facility, wherein the first signal comprises a unique identification code configured to indicate at least a partial identity of a human resource within the industrial facility;
determine a proximity of the human resource with respect to the light source based at least in part on a received signal strength indicator (RSSI) of the first signal;
generate an indication of a location of the human resource within the industrial facility based on the determined proximity of the human resource to the light source;
an electronic hardhat configured to be worn by the human resource, and wherein the electronic hardhat is configured to transmit a second signal to the light source; and
wherein the processor is configured to generate a signal to trip or shut down one or more industrial machines within the industrial facility based on the determined proximity of the human resource to the light source.
2. The system of claim 1, wherein the electronic hardhat comprises a Bluetooth® low energy (BLE) beacon device configured to transmit one or more Bluetooth® packets to the light source as the second signal, and wherein the packets comprise the unique identification code and the RSSI.
3. The system of claim 1, wherein the light source comprises a transceiver configured to generate the first signal and to transmit the first signal to the processor.
4. The system of claim 3, wherein the transceiver is configured to transmit the unique identification code, the RSSI, and identification data of the light source as the first signal.
5. The system of claim 3, wherein the transceiver is configured to transmit the first signal to a second light source prior to transmitting the first signal to the processor.
6. The system of claim 1, wherein the processor is configured to generate a graphical representation to be displayed on a display as the indication of the location of the human resource within the industrial facility.
7. The system of claim 1, wherein the light source comprises a light-emitting diode (LED) lamp, an LED lighting system, a plurality of LED devices, or a combination thereof.

8. The system of claim 1, wherein the light source comprises one of a plurality light sources communicatively coupled to each other in a wireless mesh network configuration.

9. The system of claim 1, wherein the industrial facility comprises a mining industrial facility, a power generation industrial facility, a petroleum refinery industrial facility, a manufacturing facility, a building construction site, or a combination thereof.

10. The system of claim 1, wherein the control system and the electronic hardhat are two separate elements.

11. A non-transitory computer-readable medium having computer executable code stored thereon, the code comprising instructions to:
cause a processor to receive a first signal from a light source within an industrial facility, wherein the first signal comprises a unique identification code configured to indicate at least a partial identity of a human resource within the industrial facility;
cause the processor to determine a proximity of the human resource with respect to the light source based at least in part on a received signal strength indicator (RSSI) of the first signal;
cause the processor to generate an indication of a location of the human resource within the industrial facility based on the determined proximity of the human resource to the light source;
cause the processor to generate a graphical representation to be displayed on a display as the indication of the precise or approximate location of the human resource within the industrial facility; and
cause the processor to generate a signal to trip or shut down one or more industrial machines within the industrial facility based on the determined proximity of the human resource to the light source.

12. The non-transitory computer-readable medium of claim 11, wherein the code comprises instructions to cause the processor to receive one or more Bluetooth® packets as the first signal.

13. The non-transitory computer-readable medium of claim 11, wherein the code comprises instructions to cause the processor to generate the indication of the location of the human resource based on the determined proximity of the human resource with respect to one of a plurality light sources communicatively coupled to the processor.

14. A system, comprising:
a plurality of light sources configured to illuminate an industrial facility, wherein each of the plurality of light sources comprises a transceiver configured to:
receive a first signal from a wearable electronic device configured to be worn by a human resource within the industrial facility, wherein the first signal comprises a unique identification code of the wearable electronic device and a received signal strength indicator (RSSI); and
generate and transmit a second signal to a control system of the industrial facility based at least in part on the unique identification code and the RSSI of the first signal, wherein the second signal comprises an indication of a location of the wearable electronic device within the industrial facility.

15. The system of claim 14, wherein the transceiver is configured to transmit the unique identification code, the RSSI, identification data of at least one of the plurality of light sources, and a timestamp as the second signal.

16. The system of claim 14, wherein the plurality of light sources comprises a plurality of light-emitting diode (LED) lamps, an LED lighting system, a plurality of LED devices, or a combination thereof.

17. The system of claim 14, wherein the plurality of light sources are configured to form a wireless mesh network.

18. The system of claim 14, wherein the control system is configured to determine the location of the wearable electronic device with respect to at least one of the plurality of light sources based at least in part on the RSSI of the first signal.

* * * * *